United States Patent [19]

Chen

[11] 4,130,528

[45] Dec. 19, 1978

[54] CARBOXYLATED NEOPRENE LATEX CONTAINING ALKALI-PRETREATED ZINC OXIDE OR HYDROXIDE

[75] Inventor: Mark C. Chen, Wilmington, Del.

[73] Assignee: E. I. Du Pont de Nemours and Company, Wilmington, Del.

[21] Appl. No.: 847,932

[22] Filed: Nov. 2, 1977

[51] Int. Cl.² .................. C08L 11/02; C08L 33/02
[52] U.S. Cl. .................. 260/29.7 WA; 260/29.7 M; 260/29.7 H; 260/29.7 UP
[58] Field of Search ............... 260/29.7 WA, 29.7 M, 260/29.7 H, 29.7 UP

[56] References Cited

U.S. PATENT DOCUMENTS

| | | | |
|---|---|---|---|
| 3,078,247 | 2/1963 | Sinn et al. | 260/29.7 M |
| 3,361,693 | 1/1968 | Geschwind | 260/29.7 M |
| 3,920,600 | 11/1975 | Ahramjian | 260/29.7 UA |

FOREIGN PATENT DOCUMENTS 1469993  4/1977  United Kingdom .......... 260/29.7 WA

OTHER PUBLICATIONS

DuPont, Research Disclosure Journal, Discl. No. 14619, Jun. 1976, p. 29.

Primary Examiner—M. J. Welsh

[57] ABSTRACT

Neoprene compositions containing a latex of a copolymer of chloroprene with an $\alpha,\beta$-ethylenically unsaturated carboxylic acid, such as methacrylic or acrylic acid, the polymerization being conducted in the presence of polyvinyl alcohol, and zinc oxide or zinc hydroxide which has been previously contacted with an alkali metal hydroxide are particularly well suited for use in contact adhesives.

10 Claims, No Drawings

CARBOXYLATED NEOPRENE LATEX CONTAINING ALKALI-PRETREATED ZINC OXIDE OR HYDROXIDE

BACKGROUND OF THE INVENTION

This invention is directed to improved neoprene latex compositions particularly suitable in contact adhesives.

Neoprene-based adhesives are well known to the art. Most of the earlier adhesives were of the rubber cement type, the base polymer and other additives, such as tackifiers, stabilizers, antioxidants, etc., being dissolved or dispersed in an organic solvent. However, it is expected that the demand for rubber cements will decrease with time because of their flammability, potential health hazard to persons exposed to solvent vapors, and high cost of special installations required to reduce environmental pollution hazards. Water-based neoprene adhesives have been known for many years but a new type has recently become available. The base polymer in these new compositions is a copolymer of chloroprene with an α, β-unsaturated carboxylic acid, such as methacrylic or acrylic acid, and is advantageously prepared in an aqueous emulsion in the presence of a small amount of polyvinyl alcohol. Polymer latices of this type, described in British Pat. No. 1,469,993 (to E. I. du Pont de Nemours & Company), are said to be particularly suitable in adhesives for laminating metals. Normally zinc oxide or magnesium oxide is used in those adhesive formulations as acid acceptor to assure good bond stability.

The same type of latex is used in pressure-sensitive adhesive coatings, as taught by U.S. Pat. No. 3,920,600 to L. Ahramjian. The only difference between the polymerization process of the British Patent and that of the U.S. Patent is that the former can be carried out in the presence of either an alkyl mercaptan or a dialkyl xanthogen disulfide as chain transfer agent, while the latter requires the use of a dialkyl xanthogen disulfide.

Latex adhesives of the type described in British Pat. No. 1,469,993 have also found application in contact adhesives. A typical contact adhesive is applied to both surfaces to be joined and allowed to dry. The two surfaces are then brought in contact with each other, usually under slight or moderate pressure, to effect bonding. The presence of zinc oxide in water-based contact cements is detrimental to the "contactability," especially after drying, while beneficial to bond stability and to hot bond strength.

A method of incorporating up to about 3 parts of ZnO per 100 parts of polymer without significant loss of contractibility on aging involves cooking carboxylated neoprene latex with a resin and ZnO under strictly defined conditions, Discl. No. 14619, Res. Discl. Journal, June 1976, p. 29. Since, however, this method requires an investment in cooking equipment and consumes a large amount of energy, it has not been adopted by the majority of adhesive manufacturers.

Technical bulletin SD-233 of E. I. du Pont de Nemours & Co. describes carboxylated neoprene latices: Neoprene Latex 101 and Neoprene Latex 102. This bulletin discusses on page 9 the chemical stability of these latices, including stability to alkaline compounding ingredients. To attain maximum heat resistance of these latices, the technical bulletin suggests on page 14 to raise their pH to at least 10.

While addition of alkalies to adhesive compositions based on these latices and containing zinc oxide also provides some improvement of contactability, especially after aging, this improvement is of practical magnitude only for those compositions based on low-gel neoprene latices, say, below 15% gel. Medium and high gel latices are, however, frequently used in adhesive compositions and for those compositions sufficient improvement of contactability is not achieved by adding an alkali to such a composition or to the latex itself, prior to blending with other ingredients. Furthermore, contact adhesives based on those latices do not bond at elevated temperatures, for example, above 100° C.

There is, therefore, a great need in the contact adhesive art for a water-based neoprene adhesive having good "contactability" and bond stability in the presence of zinc compounds and able to function within a broad temperature to about 125° C., irrespective of the amount of gel in the composition.

SUMMARY OF THE INVENTION

According to the present invention, there is now provided a neoprene composition comprising as its essential components: (1) a latex obtained by polymerizing in an emulsion substantially free of carboxylic soaps a mixture of chloroprene with a carboxylic acid having the formula

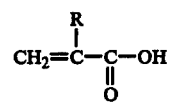

where R is hydrogen, an alkyl radical containing 1–4 carbon atoms, or a carboxymethyl radical, the proportion of said acid being about 0.4–10 mole percent of the total monomer content, in the presence of (a) about 3–10 parts of polyvinyl alcohol and (b) about 0.3–2 parts of a chain transfer agent selected from dialkyl xanthogen disulfides and alkyl mercaptans, both (a) and (b) being expressed in parts by weight based on 100 parts of total monomers, the polymer in the latex containing 10–95% gel, polyvinyl alcohol not being completely recoverable by extraction of the polymer with water; and (2) about 2–10 parts of a zinc compound selected from zinc oxide and zinc hydroxide based on the copolymer content of the latex, said zinc compound having been previously contacted with an aqueous solution of an alkali metal hydroxide selected from NaOH, KOH, and LiOH, the respective proportions of these ingredients being about 0.5–10 moles of zinc compound per mole of alkali metal hydroxide.

In addition to the above essential components, the compositions of the present invention will also usually contain other components, such as rosins, resins, humectants, thickeners, stabilizers, and/or other materials required for each particular application.

DETAILED DESCRIPTION OF THE INVENTION

The preferred amount of the zinc compound in the compositions of the present invention is 4–6 parts per 100 parts by weight of copolymer. Generally, below the lower limit of the broad range of zinc compound sufficient bond stability may not be achieved. Above the upper limit, contactability may be adversely affected. Within the preferred range, the best balance of these properties is achieved.

For the purpose of this invention, "contactability" is not a single property but a sum or result of three properties: (1) ability of the adhesive composition, after it is applied to two surfaces and dried, to form bond between both substrates, especially as a function of time after drying; (2) the strength of the newly formed bond; and (3) adhesion of the adhesive to the substrates. The first property usually is expressed as the open time, that is, time after drying within which a bond can be formed. The second property can be roughly estimated by manually attempting to separate the two substrates after bonding. And the third property is usually expressed as the contact area, that is, the area of a substrate after substrate separation which is no longer covered with adhesive plus the area of the substrate covered with adhesive after cohesive failure.

The preferred proportion of zinc compound and metal hydroxide is 1-2 moles of the former per mole of the latter.

The pretreatment of zinc compound with alkali metal hydroxide can be accomplished in any convenient way, for example, by blending the ingredients in a mixer or blender at room temperature or slightly elevated temperature for a few minutes or longer. It is believed on the basis of available solubility data that a portion of the solid zinc compound reacts under these conditions with the alkali metal hydroxide to give alkali metal zincates which dissolve in the alkaline solution. Although no scientific theory is proposed, it is possible that these dissolved zincates are responsive for the improved properties of the compositions of this invention.

Prior art adhesive compositions containing zinc oxide, including those of British Pat. No. 1,469,993, had low contactability after aging, and their contactability decreased as the amount of zinc oxide increased. By contrast, the adhesive compositions of the present invention containing increasing amounts of alkali metal hydroxide-pretreated zinc oxide or zinc hydroxide, still have good or sometimes improved contactability as well as good hot bondability, even after aging the adhesive prior to use, for example, for one month at 50° C.

Hot bondability is the ability of forming a bond when two hot substrates, each having a dried adhesive coating, are joined together.

Contactability of the adhesive composition and hot bondability of the adhesive coating after application are the two most important properties of a contact adhesive for diverse industrial application, especially for laminating decorative heat- and marproof finishes to table tops, kitchen counter tops and other surfaces. The present invention provides adhesive compositions having contactability and hot bondability greatly superior to those of other neoprene latex-based compositions.

The compositions of the present invention, in addition to being particularly well suited for adhesives, also can be used in other applications, such as, for example, films, coatings, and dipped goods.

Polymerization of a mixture of chloroprene with $\alpha,\beta$-unsaturated carboxylic acid is carried out according to the technique described in British Pat. No. 1,469,993. Except for the presence of polyvinyl alcohol and absence of carboxylic soaps, this technique is quite conventional.

Compounding of neoprene latices is well known. A good discussion of latex compounding can be found, for example, in "Neoprene Latex" by J. C. Carl, E. I. du Pont de Nemours & Co. (Inc.), Wilmington, Del., (1962), especially in Chapters III and IV. Preparation of neoprene latex adhesives is especially discussed on pages 95 ff.

This invention is now illustrated by the following examples of certain representative embodiments thereof, where all parts, proportions, and percentages are by weight unless otherwise indicated.

Chloroprene/Methacrylic Acid Copolymer

Both the polymerization technique and the gel determination technique were the same as described in Example 1 of U.S. Pat. No. 3,920,600. Latex A contained copolymerized methacrylic acid in an amount of 0.033 carboxyl equivalent per 100 g of copolymer. It had a medium gel content of about 50% and a 46% solids content. Latex B differed from Latex A in that it had a low gel content of about 10%.

Compounding Ingredients

Antioxidant: a polymeric hindered phenol sold as "Wingstay" L by Goodyear Tire and Rubber Co.
Rosin A: an aqueous dispersion (45% solids) of a hydrogenated rosin, sold as "Dresinol" 205 by Hercules, Inc.
Rosin B: an aqueous dispersion (45% solids) of a polymerized rosin, sold as "Dresinol" 215 by Hercules, Inc.
Resin: a hexamethoxymethylmelamine resin, sold as "Cymel" 303 by American Cyanamid Co.
Thickener: a carboxymethylhydroxypropyl guar gum, sold as "Jaguar" CMHP by Stein-Hall Co.
Polyvinyl Alcohol: a polymer sold as "Gelvatol" 20-30 by Monsanto Corp.
Surfactant: a 10% solution of polymerized sodium salts of naphthalenesulfonic acids sold as "Daxad" 11 by W. R. Grace & Co.

The following testing procedures were used:
Contactability: The adhesive was applied to the back of a "Formica" (trademark for laminated plastic, American Cyanamid Co.) strip and a particle board strip and allowed to dry, becoming a clear film, at ambient temperature. After the indicated aging time of the dried samples, the samples were mated and the bond established by applying uniform pressure with a "Jay" roller. The "Formica" strip was peeled off by hand and the bond strength noted. The adhesive contact area was visually estimated.

Bond Shear Strength I: A film (0.006-0.008 cm) of adhesive was applied with a brush to "Formica"-10 high pressure laminate (15.24 cm × 45.72 cm) and "Fin Ply" (Finnish Plywood Devel. Assoc.) Exterior WBP all birch panel, grade 1/111 (BU/BB) (0.95 cm × 15.24 cm × 45.72 cm long, grain). After the adhesive films had dried, the laminate was indexed over the wood core and fusion of adhesive films effected. The bond was established with uniform pressure from a "Jay" roller or nip roller. The bond was aged for 3-6 days and the assembly cut into three pieces (15.24 cm wide × 13.97 cm long, grain). Saw kerfs were made perpendicular to the grain direction through from both sides (laminate and wood) such that a 1.27 cm lap section was formed in the middle. Individual shear specimens were obtained from these pieces by cutting them into strips 1.92 cm wide × 13.97 cm long (grain). The actual lap-shear area was 2.42 cm². The specimens were pulled on a tensile machine with self-aligning jaws. Crosshead separation rates were maintained at 0.51 cm/min and the jaws separation set at 7.62 cm. The shear at rupture value was calculated in terms of kilograms per square centimeter of lap area for each specimen.

Bond Shear Strength II: The adhesive was applied to plywood samples and allowed to dry. The samples were mated resulting in a bond area of 12.9 cm². The samples were tested for shear strength at 80° C. using a separation speed of 1.27cm/min.

Hot Bondability: The adhesive was applied to 2.54 cm × 10.16 cm × 0.13 cm "Formica" strips. The strips were dried in 100° C. or 121° C. ovens for 15–30 minutes followed by laminating of two strips (with a 2.54 cm × 5.08 cm overlap area) in the oven and immediate creep testing with a 1.5 kg weight. The time required for complete separation of the strips was measured as an indication of hot bondability.

Creep Testing: The adhesive was applied to 2.54 cm × 15.24 cm canvas strips and dried at ambient temperature. The strips were mated and the sample aged four days at ambient temperature. The bond area was 2.54 cm × 12.70 cm. One free end of the sample was suspended in an 80° C. oven and the sample preheated for 5 minutes. At that time a 1.5 kg weight was attached to the other free end and the amount of creep (distance of peel) as percentage of the 12.70 cm maximum was measured at intervals. A creep of 12.70 cm resulted in failure of the sample.

Preparation of Zinc Salt Dispersions

The following ingredients were ball milled for at least 24 hours or mixed in an attritor for at least 1.5 hours.

|  | I | II | III |
|---|---|---|---|
| Zn(OH)$_2$ | 10 | — | — |
| ZnO | — | 8.1 | 100 |
| 10% Aqueous NaOH (Wet Wt.) | 40 | 40 | — |
| Polyvinyl Alcohol | 0.5 | 0.5 | — |
| 20% Aqueous Polyvinyl Alcohol (Wet Wt.) | — | — | 5 |
| Water | — | — | 190 |
| Surfactant | — | — | 5 |

Preparation of Master Batch Compositions (Dry Weight)

The following ingredients were placed in a container and mixed at room temperature for 10–20 minutes using a mechanical stirrer and moderate agitation.

|  | MB-1 | MB-2 |
|---|---|---|
| Polymer Latex A | 50 | 50 |
| Polymer Latex B | 50 | 50 |
| Antioxidant | 2 | 2 |
| Rosin B | 30 | — |
| Rosin A | — | 30 |
| Resin | 5 | — |
| Total Dry Weight | 137 | 132 |

EXAMPLE 1

Comparison of Conventional ZnO, Post-Added Caustic, and Caustic-Treated ZnO

|  | Control 1 | Control 2 | Control A | Control B | Control C | Sample D | Sample E | Sample F |
|---|---|---|---|---|---|---|---|---|
| MB-1 (Dry Wt.) | 137 | 137 | 137 | 137 | — | 137 | 137 | — |
| MB-2 (Dry Wt.) | — | — | — | — | 132 | — | — | 137 |
| Dispersion III | 9 | 15 | 9 | 15 | 9 | — | — | — |
| Dispersion II | — | — | — | — | — | 20 | 30 | 20 |
| 10% NaOH (Wet Wt.) | — | — | 14.8 | 24.7 | 14.8 | — | — | — |
| Resin | — | — | — | — | 5 | — | — | 5 |
| Ethyleneglycol Monobutyl Ether | 4 | 4 | 4 | 4 | 4 | 4 | 4 | 4 |
| Propylene Glycol | 2 | 2 | 2 | 2 | 2 | 2 | 2 | 2 |
| Thickener | 0.5 | 0.5 | — | — | — | — | — | — |
| Contactability (Adhesive Aged 24 Hrs/70° C)* | | | | | | | | |
| 1 Hr. After Drying | | | | | | | | |
| Contact Area (%) | 30 | 10 | 30 | 0 | 30 | 75 | 40 | 80 |
| Bond Strength | Fair | Poor | Fair | Poor | Fair | V.Good | Poor | Good |
| 1.5 Hr. After Drying | | | | | | | | |
| Contact Area (%) | 25 | ~0 | ~5 | 0 | 60 | 35 | 65 | 65 |
| Bond Strength | Poor | Poor | Poor | Poor | Good | Good | Fair | Good |
| 2 Hrs. After Drying | | | | | | | | |
| Contact Area (%) | 30 | 0 | 0 | 5 | 10 | 0 | 75 | 65 |
| Bond Strength | Fair | Poor | Poor | Poor | Poor | Poor | Good | Excellent |
| Hot Bondability at 100° C | | | | | | | | |
| Time to Failure (min.) | — | 3.5 | — | >20 | 7.5 | — | >20 | 6 |
| Hot Bondability at 121° C | | | | | | | | |
| Time to Failure (min.) | — | — | 8 | >20 | — | 11 | >20 | — |
| Shear Strength II | | | | | | | | |
| 80° C (Kg/cm$^2$) | 2.95 | 3.73 | 3.06 | — | 2.11 | 4.36 | — | 2.11 |

*Accelerated Test. Results approximate those for aging for four weeks at 50° C.

Controls 1 and 2 contain zinc oxide, but not alkali-pretreated zinc oxide, at two different levels. In Control 1 the amount of ZnO is 3 phr and in Control 2, 5 phr. Both exhibit fair to poor contactability, and Control 2 has low hot bondability. Controls A, B, and C contain zinc oxide at 3 phr and 5 phr levels, respectively, and post-added sodium hydroxide, rather than sodium hydryxide-pretreated zinc oxide. Samples D, E, and F were prepared according to the present invention. Samples D and F contain 3 phr of zinc oxide, and Sample E 5 phr of zinc oxide. Comparison of A with D, B with E, and C with F shows that compositions containing pretreated zinc oxide have much better contactability for the aged adhesive than the compositions containing post-added alkali. They have generally comparable, good, hot bondability and overall better shear strength. As a general comment, the contactability decreases with time and in some cases falls below an acceptable level within two hours after drying. However, an open time of about one hour is considered satisfactory for most industrial applications.

EXAMPLE 2

Improvement of Contactability by the Use of Caustic-Pretreated Zn(OH)$_2$ Dispersion

|  | Control | Example |
|---|---|---|
| Polymer Latex A (Dry Wt.) | 50 | 50 |
| Polymer Latex B (Dry Wt.) | 50 | 50 |
| Antioxidant | 2 | 2 |
| Rosin A | 30 | 30 |
| ZnO | 2.2 | — |
| Dispersion I | — | 13.6* |
| Ethyleneglycol Monobutyl Ether | 4 | 4 |

-continued

| Improvement of Contactability by the Use of Caustic-Pretreated Zn(OH)$_2$ Dispersion | | |
|---|---|---|
| | Control | Example |
| Propylene Glycol | 2 | 2 |
| Contactability (Adhesive Aged 30 Days/50° C) | | |
| 2 Hrs. After Drying | | |
| Contact Area (%) | 5 | 65 |
| Bond Strength | Poor | Fair |
| Shear Strength I | | |
| Room Temperature (Kg/cm$^2$) | 20.1 | 26.9 |
| 80° C (Kg/cm$^2$) | 1.95 | 3.70 |

*Equivalent to 2.2 phr in the control run

This example shows that both contactability and shear strength are improved when alkali-treated Zn(OH)$_2$ is used in lieu of untreated ZnO.

I claim:

1. A neoprene composition comprising as its essential components:
   (1) a latex obtained by polymerizing in an emulsion substantially free of carboxylic soaps a mixture of chloroprene with a carboxylic acid having the formula

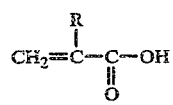

where R is hydrogen, an alkyl radical containing 1-4 carbon atoms, or a carboxymethyl radical, the proportion of said acid being about 0.4-10 mole percent of the total monomer content, in the presence of
   (a) about 3-10 parts of polyvinyl alcohol and
   (b) about 0.3-2 parts of a chain transfer agent selected from dialkyl xanthogen disulfides and alkyl mercaptans,
both (a) and (b) being expressed in parts by weight based on 100 parts of total monomers, the polymer in the latex containing 10-95% gel, polyvinyl alcohol not being completely recoverable by extraction of the polymer with water; and
   (2) about 2-10 parts of a zinc compound selected from zinc oxide and zinc hydroxide based on the copolymer content of the latex, and zinc compound having been previously contacted with an aqueous solution of an alkali metal hydroxide selected from NaOH, KOH, and LiOH, the respective proportions of these ingredients being about 0.5-10 moles of zinc compound per mole of alkali metal hydroxide.

2. The composition of claim 1 wherein the proportion of the zinc compound is 4-6 parts per 100 parts by weight of copolymer.

3. The composition of claim 2 wherein the ratio of the zinc compound to the alkali metal hydroxide is 1-2 moles per mole.

4. Use of a neoprene composition of claim 1 as a contact adhesive.

5. Use of a neoprene composition of claim 2 as a contact adhesive.

6. Use of a neoprene composition of claim 3 as a contact adhesive.

7. A contact adhesive composition comprising as its essential components:
   (1) a latex obtained by polymerizing in an emulsion substantially free of carboxylic soaps a mixture of chloroprene with a carboxylic acid having the formula

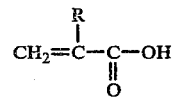

where R is hydrogen, an alkyl radical containing 1-4 carbon atoms, or a carboxymethyl radical, the proportion of said acid being about 0.4-10 mole percent of the total monomer content, in the presence of
   (a) about 3-10 parts of polyvinyl alcohol and
   (b) about 0.3-2 parts of a chain transfer agent selected from dialkyl xanthogen disulfides and alkyl mercaptans,
both (a) and (b) being expressed in parts by weight based on 100 parts of total monomers, the polymer in the latex containing 10-95% gel, polyvinyl alcohol not being completely recoverable by extraction of the polymer with water; and
   (2) about 2-10 parts of a zinc compound selected from zinc oxide and zinc hydroxide based on the copolymer content of the latex, and zinc compound having been previously contacted with an aqueous solution of an alkali metal hydroxide selected from NaOH, KOH, and LiOH, the respective proportions of these ingredients being about 0.5-10 moles of zinc compound per mole of alkali metal hydroxide.

8. A composition of claim 7 wherein the gel content of the polymer is at least 15% of the total copolymer.

9. A composition of claim 8 wherein the proportion of the zinc compound is 4-6 parts per 100 parts by weight of the copolymer.

10. A composition of claim 8 wherein the ratio of the zinc compound to the alkali metal hydroxide is 1-2 moles per mole.

* * * * *